_(12)_ United States Patent
Ishida (10) Patent No.: US 8,725,735 B2
(45) Date of Patent: May 13, 2014

(54) INFORMATION PROCESSING SYSTEM, INFORMATION PROCESSING METHOD, PROGRAM, AND NON-TRANSITORY INFORMATION STORAGE MEDIUM

(75) Inventor: Takayuki Ishida, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/547,208

(22) Filed: Jul. 12, 2012

(65) Prior Publication Data

US 2013/0031093 A1 Jan. 31, 2013

(30) Foreign Application Priority Data

Jul. 25, 2011 (JP) ................................. 2011-162137

(51) Int. Cl.
*G06F 17/30* (2006.01)
(52) U.S. Cl.
USPC .......................................................... 707/737
(58) Field of Classification Search
USPC .......................................................... 707/737
See application file for complete search history.

(56) References Cited

U.S. PATENT DOCUMENTS

| | | | |
|---|---|---|---|
| 2006/0101017 A1* | 5/2006 | Eder | 707/7 |
| 2011/0029464 A1* | 2/2011 | Zhang et al. | 706/12 |
| 2011/0321072 A1* | 12/2011 | Patterson et al. | 725/5 |
| 2012/0166453 A1* | 6/2012 | Broder | 707/752 |

\* cited by examiner

*Primary Examiner* — Sherief Badawi
*Assistant Examiner* — Courtney Harmon
(74) *Attorney, Agent, or Firm* — Matthew B. Dernier, Esq.; Gibson & Dernier LLP (57) ABSTRACT

A difference in tendency of times associated with combinations of content clusters and user clusters among the user clusters is reflected in a result of correspondence between the content cluster and the user cluster. A data acquisition unit acquires association data indicating a combination of a content belonging to the content cluster, a user belonging to one of a plurality of user clusters, and a time relating to a combination of the content and the user. A dividing unit divides, under a condition that the tendency of the times associated with the users in the association data differs among the plurality of user clusters to which the users belong, the content cluster into a plurality of clusters each corresponding to at least one of the plurality of user clusters.

5 Claims, 6 Drawing Sheets

| COMMENT ID | CONTENT ID | USER ID | POSTING DATE /TIME DATA | COMMENT DATA | |
|---|---|---|---|---|---|
| 0001 | 0007 | 0033 | 2011/07/06 10:00:09 | It was fun. | }20 |
| 0002 | 0015 | 0016 | 2011/07/06 13:33:15 | I am looking forward to next. | }20 |
| 0003 | 0029 | 0085 | 2011/07/06 14:09:37 | It was boring. | }20 |

| CONTENT ID | TOTAL NUMBER OF POSTINGS | POSTING FREQUENCY | UNIQUE USER RATIO | INITIAL POSTING DATE/TIME | |
|---|---|---|---|---|---|
| 0001 | 35 | 4.2 | 0.31 | 2011/07/09 11:35:40 | }50 |
| 0002 | 70 | 10.6 | 0.59 | 2011/07/16 14:36:15 | }50 |
| | | | | | |

FIG. 6

| USER ID | TOTAL NUMBER OF POSTINGS | POSTING FREQUENCY | UNIQUE CONTENT RATIO | INITIAL POSTING DATE/TIME | |
|---|---|---|---|---|---|
| 0001 | 153 | 2.3 | 0.85 | 2011/07/06 15:47:09 | }52 |
| 0002 | 37 | 1.1 | 0.69 | 2011/07/08 09:05:15 | }52 |
| | | | | | |

FIG. 7

| CONTENT CLUSTER ID | CONTENT ID | |
|---|---|---|
| 0001 | 0001, 0057, 0078, 0147,··· | }54 |
| 0002 | 0015, 0065, 0095, 0235,··· | }54 |
| | | |

FIG. 8

| USER CLUSTER ID | USER ID | |
|---|---|---|
| 0001 | 0007, 0023, 0054,··· | }56 |
| 0002 | 0016, 0044, 0071,··· | }56 |
| | | |

| CONTENT CLUSTER ID | USER CLUSTER ID | |
|---|---|---|
| 0001 | 0035 | }58 |
| 0002 | 0001 | }58 |
| 0102 | 0002 | }58 |
| 0003 | 0049 | }58 |
| 0005 | 0035 | }58 |
| 0016 | 0049 | }58 |
| 0020 | 0060 | }58 | ic.
INFORMATION PROCESSING SYSTEM, INFORMATION PROCESSING METHOD, PROGRAM, AND NON-TRANSITORY INFORMATION STORAGE MEDIUM

CROSS-REFERENCE TO RELATED APPLICATION

The present application claims priority from Japanese application JP 2011-162137 filed on Jul. 25, 2011, the content of which is hereby incorporated by reference into this application.

BACKGROUND OF THE INVENTION

1. Field of the Invention

The present invention relates to an information processing system, an information processing method, a program, and a non-transitory information storage medium.

2. Description of the Related Art

There is a shopping system that provides information relating to contents such as games or movies to a client or contents in response to a purchase request received from the client. One of such shopping systems has a recommendation function of providing information relating to contents recommended to a user.

To achieve such a recommendation by the shopping system, for example, the following method can be employed. First, the shopping system classifies, by using a well-known clustering method (e.g., self organization map (SOM)), users having information registered in the shopping system into a plurality of user clusters based on their attributes, and contents having information registered in the shopping system into a plurality of content clusters based on their attributes. The shopping system then sets correspondence between content clusters and user clusters determined to be high in relationship based on a given standard. The shopping system provides, in response to a request from a user, information relating to a content belonging to a content cluster corresponding to a user cluster to which the user belongs. Information relating to recommended contents is accordingly provided to the users of the shopping system.

SUMMARY OF THE INVENTION

Concerning contents belonging to a specific content cluster, as in the case of a tendency in which while teenagers mainly purchase the contents at the time of their release, people in their thirties mainly purchase the contents after three months from the release, under the condition that there are a plurality of user clusters corresponding to a content cluster, a tendency of a time associated with a combination of a content cluster and a user cluster may differ among the user clusters. If recommendations can be offered based on such a difference in tendency of a time associated with a combination of a content cluster and a user cluster among the user clusters, it is expected that more accurate recommendations can be made to the user.

In the conventional art, however, even under the condition that the tendency of the time associated with the combination of a content cluster and a user cluster is different among the user clusters, the difference in tendency of the time has not been reflected in a result of correspondence between the content cluster and the user cluster.

The present invention has been made in view of the above-mentioned problem, and an object of some embodiments of the invention is to reflect a difference in tendency of a time associated with a combination of a content cluster and a user cluster among user clusters in a result of correspondence between the content cluster and the user cluster.

In order to solve the above-mentioned problem, according to an exemplary embodiment of the present invention, there is provided an information processing system, including: an association data acquisition unit that acquires association data indicating a combination of a content belonging to a content cluster, a user belonging to one of a plurality of user clusters, and a time relating to a combination of the content and the user; and a dividing unit that divides, under the condition that a tendency of times associated with users in the association data differs among the plurality of user clusters to which the users belong, the content cluster into a plurality of clusters each corresponding to at least one of the plurality of user clusters.

According to an exemplary embodiment of the present invention, there is provided an information processing method, including: acquiring association data indicating a combination of a content belonging to a content cluster, a user belonging to one of a plurality of user clusters, and a time relating to a combination of the content and the user; and dividing, under the condition that a tendency of times associated with users in the association data differs among the plurality of user clusters to which the users belong, the content cluster into a plurality of clusters each corresponding to at least one of the plurality of user clusters.

According to an exemplary embodiment of the present invention, there is provided a program stored in a non-transitory computer readable information storage medium, which is to be executed by a computer, the program including instructions to: acquire association data indicating a combination of a content belonging to a content cluster, a user belonging to one of a plurality of user clusters, and a time relating to a combination of the content and the user; and divide, under the condition that a tendency of times associated with users in the association data differs among the plurality of user clusters to which the users belong, the content cluster into a plurality of clusters each corresponding to at least one of the plurality of user clusters.

According to the exemplary embodiment of the present invention, there is provided a non-transitory computer readable information storage medium storing a program which is to be executed by a computer, the program including instructions to: acquire association data indicating a combination of a content belonging to a content cluster, a user belonging to one of a plurality of user clusters, and a time relating to a combination of the content and the user; and divide, under the condition that a tendency of times associated with users in the association data differs among the plurality of user clusters to which the users belong, the content cluster into a plurality of clusters each corresponding to at least one of the plurality of user clusters.

According to the exemplary embodiments of the present invention, under the condition that the tendency of the times associated with the users in the association data is different among the user clusters to which the users belong, a content cluster is divided into the plurality of clusters, each of which corresponding to at least one user cluster. Thus, the difference in tendency of the time associated with the combination of a content cluster and a user cluster among the user clusters is reflected in the result of correspondence between the content cluster and the user cluster.

In the exemplary embodiment of the present invention, the dividing unit divides the content cluster into the plurality of clusters so that a content belonging to each cluster is associated with a user belonging to a user cluster corresponding to the each cluster in the association data.

In the exemplary embodiment of the present invention, the information processing system further includes a statistic amount calculation unit that calculates, based on a time associated with at least one user belonging to the user cluster in the association data, a statistic amount relating to a distribution of times in the user cluster, and the dividing unit is configured to: determine whether or not to divide the content cluster into the plurality of clusters based on a difference among statistic amounts calculated for the plurality of user clusters, respectively; and divide, under the condition that it is determined to divide the content cluster into the plurality of clusters, the content cluster into the plurality of clusters.

In the exemplary embodiment of the present invention, the information processing system further includes a determination unit that determines strength of a relationship between a content cluster and a user cluster based on strength of a relationship between a content belonging to the content cluster and a user belonging to the user cluster, and the dividing unit divides, under the condition that, in association data indicating a combination of the content belonging to the content cluster, a user belonging to one of the plurality of user clusters determined to have a strong relationship to the content cluster by the determination unit, and a time relating to a combination of the content and the user, a tendency of times associated with users differs among the plurality of user clusters to which the users belong, the content cluster into the plurality of clusters.

In the exemplary embodiment of the present invention, the information processing system further includes an information providing unit that provides, to the user, information relating to a content belonging to a content cluster corresponding to the user cluster to which the user belongs.

In the exemplary embodiment of the present invention, the time indicated by the association data is one of a time when the user accesses information relating to the content, a time when a comment on the content is received from the user, and a time when the user purchases the content.

DETAILED DESCRIPTION OF THE INVENTION

Hereinafter, an embodiment of the present invention is described in detail below referring to the drawings.

Figure 1:
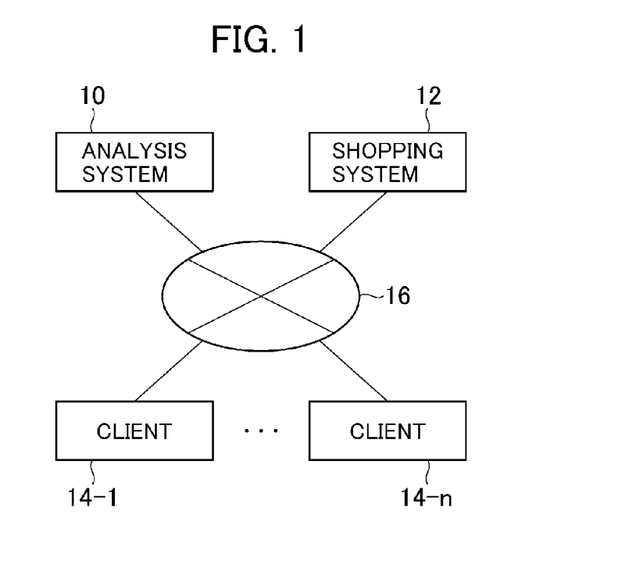
FIG. 1 is a diagram illustrating an overall configuration of a computer network according to an embodiment of the present invention.

FIG. 1 is a diagram illustrating an overall configuration of a computer network 16 according to the embodiment of the present invention. As illustrated in FIG. 1, an analysis system 10, a shopping system 12, and clients 14 (14-1 to 14-n), which are all constructed based on computers, are connected to the computer network 16 such as the Internet. The analysis system 10, the shopping system 12, and the clients 14 can communicate to/from one another.

The analysis system 10, which is a computer system such as a server functioning as an information processing system of this embodiment, analyzes data registered in the shopping system 12, and assists a recommendation function of contents provided to a user by the shopping system 12.

The shopping system 12 is, for example, a computer system such as a server that provides services of a shopping site enabling the user to purchase contents such as games or movies.

Each of the analysis system 10 and the shopping system 12 includes, for example, a control unit that is a program control device such as a central processing unit (CPU) which operates in accordance with a program installed in the own device, a storage unit that is a storage element such as a read-only memory (ROM) or a random access memory (RAM), or a hard disk drive, and a communication unit that is a communication interface such as a network board. Those elements are interconnected to each other via a bus. The storage units of the analysis system 10 and the shopping system 12 store programs executed by the control units of the own devices. The storage units of the analysis system 10 and the shopping system 12 also operate as work memories of the own devices.

The client 14, which is a computer utilized by a user of the analysis system 10 or the shopping system 12, is, for example, a personal computer, a game console, a television set, a portable game device, or a personal digital assistant. The client 14 includes, for example, a control device such as a CPU, a storage device such as a storage element including a ROM or a RAM, or a hard disk drive, an output device such as a display or a speaker, an input device such as a game controller, a touch pad, a mouse, a keyboard, or a microphone, a communication device such as a network board, and an optical disc drive that reads data from an optical disc (computer readable information storage medium) such as a digital versatile disc (DVD)-ROM or Blu-ray (registered trademark) disc.

The client 14 of this embodiment has a web browser installed therein in advance. According to this embodiment, the client 14 accesses the shopping system 12 through the web browser, and inputs a user ID and a password to log in. Then, when the client 14 accesses a predetermined uniform resource locator (URL), a screen corresponding to the predetermined URL is displayed on the display of the client 14. After the entry of the user ID and the password, the shopping system 12 can determine the user ID of the user who utilizes the client 14 by, for example, referring to a session ID.

Figure 2:
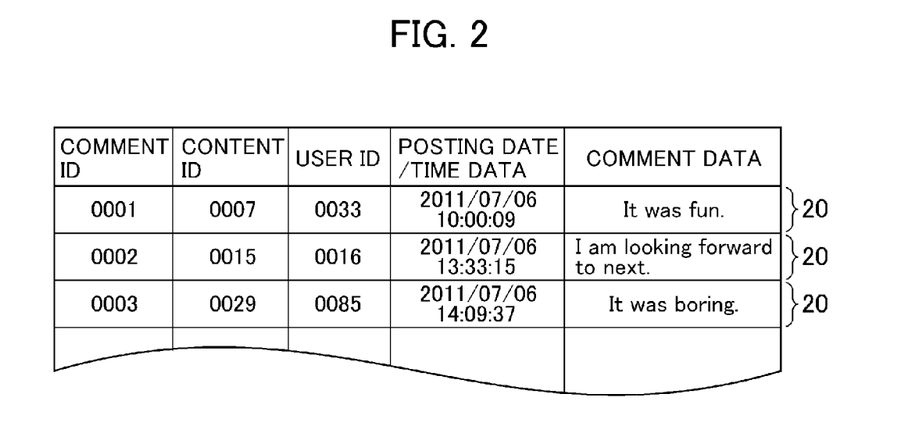
FIG. 2 illustrates an example of posting history data.

The shopping system 12 of this embodiment provides the client 14 with a page showing information on contents purchasable by the user. According to this embodiment, when the client 14 accesses a URL corresponding to a content via the web browser, a page including information relating to the content is displayed on the display of the client 14. Further, the shopping system 12 of this embodiment can receive from the client 14 a comment on the content such as an impression on the content such as an impression on the content posted by the user who has purchased the content. The comments thus received are accumulated in the storage unit of the shopping system 12 as posting history data 20 illustrated in FIG. 2 as an example. As illustrated in FIG. 2, the posting history data 20 includes a comment ID that is an identifier of a comment, a content ID that is an identifier of a content targeted for posting, a user ID that is an identifier of a user who has posted the comment, data indicating the time of receiving the comment on the content (in this embodiment, posting date/time data indicating the date/time of registering the posted comment), and comment data indicating details of the comment.

Figure 3:
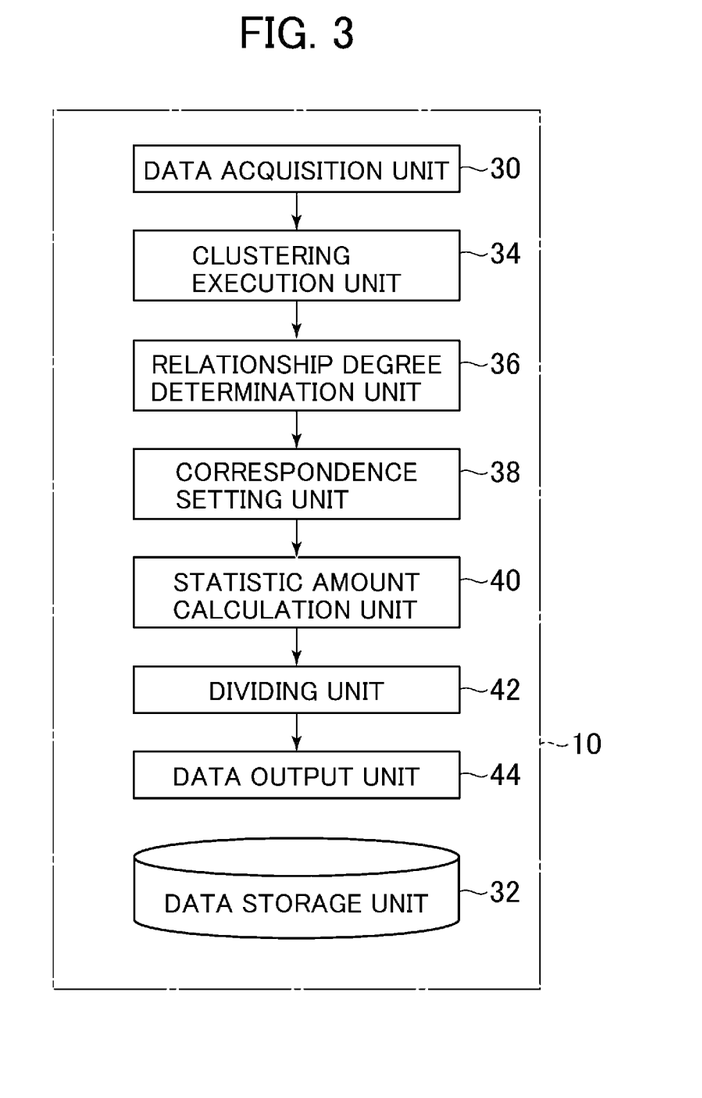
FIG. 3 is a functional block diagram illustrating an example of functions implemented by an analysis system according to the embodiment of the present invention.

FIG. 3 is a functional block diagram illustrating an example of functions implemented by the analysis system 10 of this embodiment. In the analysis system 10 of this embodiment, other functions are implemented in addition to those illustrated in FIG. 3. As illustrated in FIG. 3, the analysis system 10 functionally includes a data acquisition unit 30, a data storage unit 32, a clustering execution unit 34, a relationship degree determination unit 36, a correspondence setting unit 38, a statistic amount calculation unit 40, a dividing unit 42, and a data output unit 44. The data storage unit 32 is implemented mainly by the storage unit included in the analysis system 10. The other elements are implemented mainly by the control unit included in the analysis system 10.

Those functions are implemented by executing a program of this embodiment in the analysis system 10 that is a computer. This program may be downloaded from another computer via a communication interface through a computer communication network, or may be stored in an optical disc (e.g., compact disc (CD)-ROM or DVD-ROM) or a computer readable information storage medium such as a universal serial bus (USB) memory, and then installed in the analysis system 10 via an optical disc drive or a USB port.

The analysis system 10 of this embodiment, based on the posting history data 20 stored in the storage unit of the shopping system 12, executes analysis processing on correspondence between the user and the content. An example of a flow of analysis processing performed in the analysis system 10 of this embodiment is described referring to a flowchart of FIG. 4.

Figure 4:
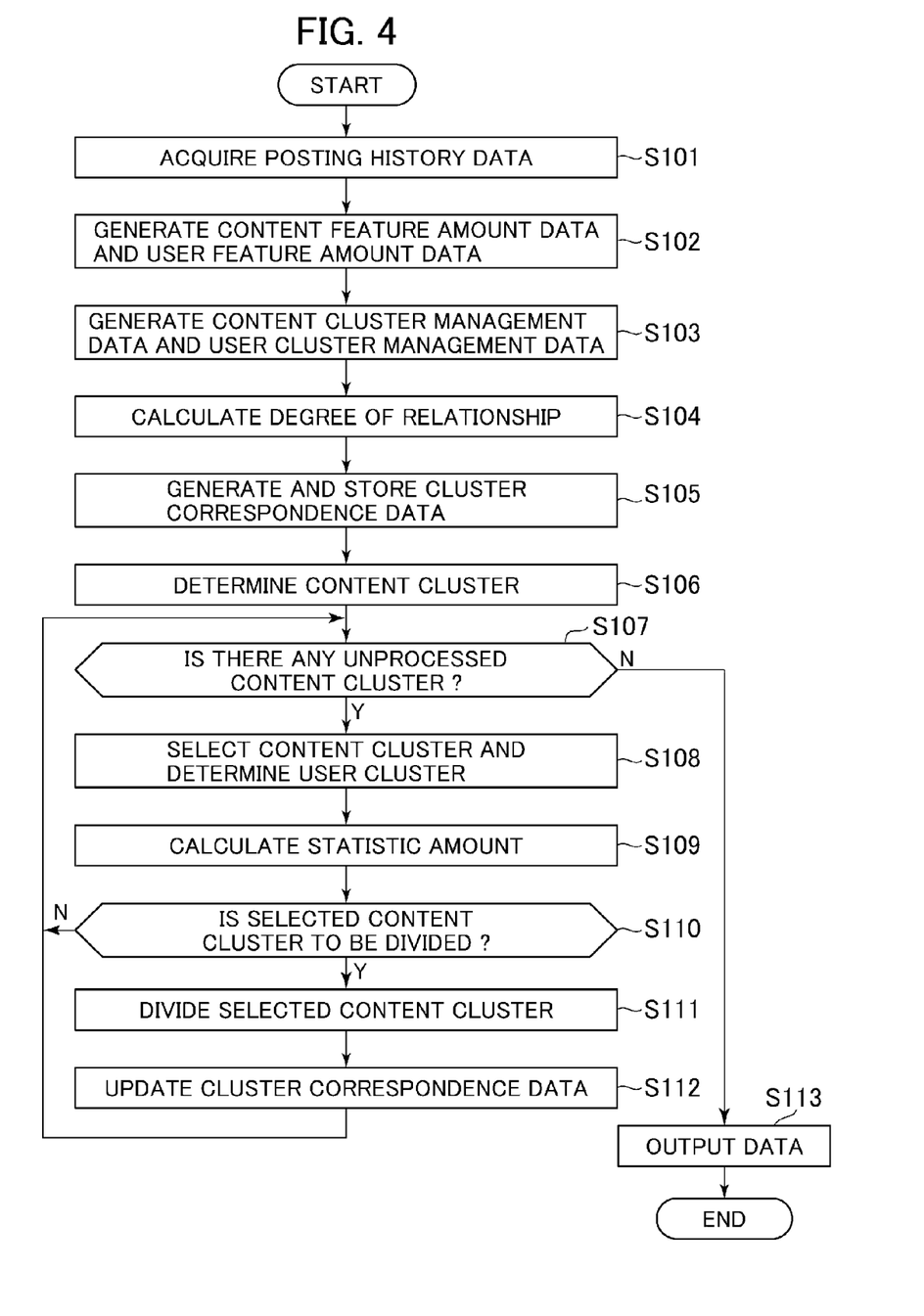
FIG. 4 is a flowchart illustrating an example of a flow of processing performed in the analysis system according to the embodiment of the present invention.

First, in Step S101, the data acquisition unit 30 acquires the posting history data 20 stored in the storage unit of the shopping system 12 to store the posting history data 20 in the data storage unit 32.

Figure 5:
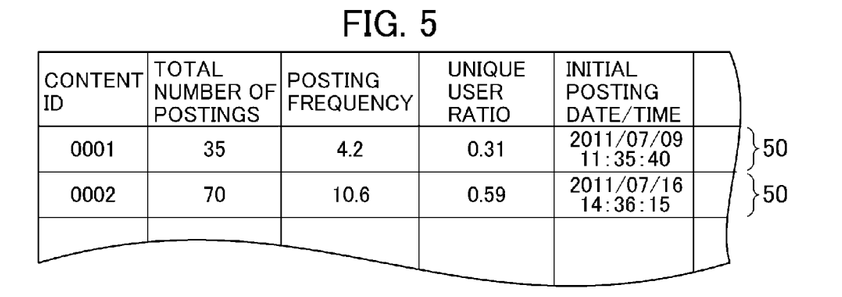
FIG. 5 illustrates an example of content feature amount data.
Figure 6:
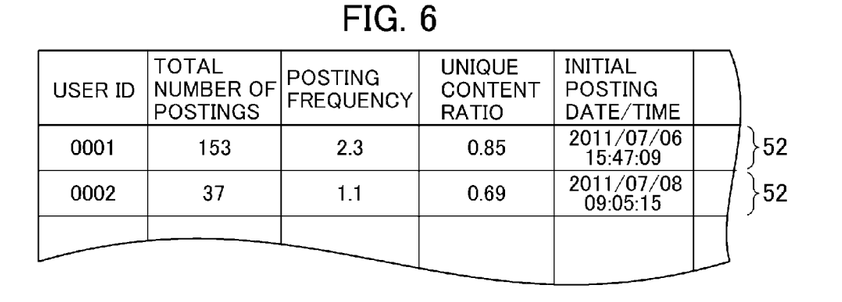
FIG. 6 illustrates an example of user feature amount data.

Then, in Step S102, the clustering execution unit 34 generates, based on a combination of the content ID and the posing date/time included in the posting history data 20, content feature amount data 50 illustrated in FIG. 5 as an example and user feature amount data 52 illustrated in FIG. 6 as an example.

As illustrated in FIG. 5, the content feature amount data 50 includes a content ID, the total number of postings for the content, a posting frequency indicating the number of postings per unit time (e.g., day) for the content, a unique user ratio that is a value obtained by dividing the number of unique users (number of users obtained when a user who has made a plurality of postings is counted as one user) who have posted comments on the content by the total number of users who have posted comments on the content (i.e. the total number of posted comments on the content), and an initial posting date/time indicating a date/time at which a comment on the content is posted for the first time. The content feature amount data 50 may include, in addition to the above-mentioned data, for example, (1) a Gini coefficient calculated based on a distribution of posting intervals for the content, (2) a day of the largest number of postings which is obtained when the total number of postings is calculated for the content in a predetermined time unit (e.g., a day), (3) the number of postings on the day, (4) a dur average on the day, (5) a day of the second largest number of postings, (6) the number of postings on the day, (7) a dur average on the day, and (8) the number of days from the day of the largest number of postings to a day on which postings half in number of the postings on the day of the largest number of postings are carried out on the content (half period).

As illustrated in FIG. 6, the user feature amount data 52 includes a user ID, the total number of postings which the user has executed, a posting frequency indicating the number of postings per unit time (e.g., day) by the user, a unique content ratio that is a value obtained by dividing the number of unique contents (number of contents which is obtained when a content on which the user has made a plurality of postings is counted as one content) on which the user has posted comments by the total number of postings by the user, and an initial posting date/time indicating a date/time at which a comment on the content is posted by the user for the first time. The user feature amount data 52 may include, in addition to the above-mentioned data, for example, (1) for the contents on which the user has posted the comments, an average value among timestamp values corresponding to the initial posting date/times, (2) for the contents on which the user has posted the comments, an average value of the numbers of unique users who have posted comments on the content, (3) for the contents on which the user has posted the comments, an average value of the numbers of days from the user's initial posting dates to days of the largest number of postings, which are obtained when the number of postings is calculated in a predetermined time unit (e.g., a day), (4) for the contents on which the user has posted the comments, an average value of the numbers of postings on the day of the largest number of postings, which are obtained when the number of postings is calculated in a predetermined time unit (e.g., a day), (5) for the contents on which the user has posted the comments, an average value of the numbers of days from the user's initial posting dates to days of the second largest number of postings, which are obtained when the number of postings is calculated in a predetermined time unit (e.g., a day), (6) for the contents on which the user has posted the comments, an average value of the numbers of postings on the day of the second largest number of postings, which are obtained when the number of postings is calculated in a predetermined time unit (e.g., a day), (7) a value of r which is obtained when a day of the week or time is represented by r-theta, and (8) a value of theta which is obtained when the a day of the week or the time is represented by r-theta.

Figure 7:
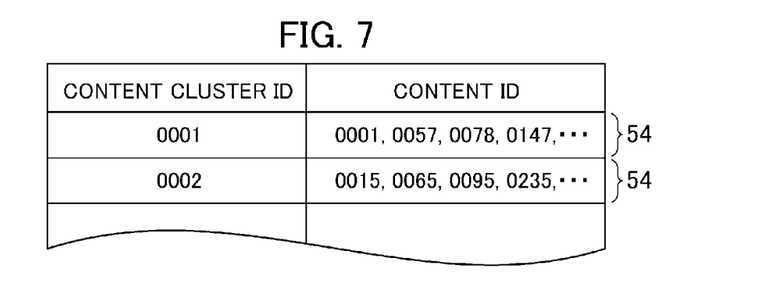
FIG. 7 illustrates an example of content cluster management data.

Then, in Step S103, the clustering execution unit 34 executes clustering based on the content feature amount data 50 generated in Step S102 to generate content cluster management data 54 illustrated in FIG. 7 as an example, and stores the content cluster management data 54 in the data storage unit 32. The clustering execution unit 34 then executes clustering based on the user feature amount data 52 generated in Step S102 to generate user cluster management data 56 illustrated in FIG. 8 as an example, and stores the user cluster management data 56 in the data storage unit 32.

The clustering execution unit 34 executes clustering that uses, for example, a self organization map (SOM). An outline of an example of clustering executed in Step S103 is described. Herein, a vector whose components are values of parameters other than the content ID included in the content feature amount data 50 is referred to as a feature amount vector.

First, the clustering execution unit 34 executes principal component analysis on the content feature amount data 50, and generates node data pieces each corresponding to one of positions arranged on two-dimensional coordinates in accordance with a given rule. A reference vector that is the above-mentioned feature amount vector corresponding to the node data is associated with the node data. The node data corresponds to a cluster in the clustering. In the SOM, as a distance between the reference vectors associated with the node data is shorter, the positions corresponding to the node data are nearer.

(1) The clustering execution unit 34 calculates, for each content feature amount data piece 50, a degree of approximation between a feature amount vector corresponding to the content feature amount data piece 50 and a reference vector associated with each node data piece by a given calculation formula. (2) The clustering execution unit 34 associates each content feature amount data piece 50 with node data associated with a reference vector having a degree of approximation calculated to be the largest. (3) The clustering execution unit 34 executes, for each node data piece, learning by using the content feature amount data 50 associated with the node data piece and the reference vectors associated with neighboring node data pieces as inputs, and updates the reference vector associated with the node data piece.

The clustering execution unit 34 repeats the above-mentioned processing (1) to the processing (3) until an updating amount of the reference vector becomes equal to or less than a predetermined amount (until a result converges) in the processing (3). As a result, final content feature amount data 50 and a final reference vector associated with each node data piece are determined.

The clustering execution unit 34 then generates the content cluster management data 54 corresponding to the node data. The content cluster management data 54 includes a content cluster ID that is an identifier of the content cluster management data 54, and a content ID included in the content feature amount data 50 associated with the corresponding node data. The content cluster management data 54 can include a plurality of content IDs, or a value of the content ID included in the content cluster management data 54 can be null.

Hereinafter, a cluster corresponding to the content cluster management data 54 is referred to as a content cluster. In this embodiment, the content cluster management data 54 indicates that a content corresponding to the content ID included in the content cluster management data 54 belongs to a content cluster corresponding to a content cluster ID included in the content cluster management data 54.

Figure 8:
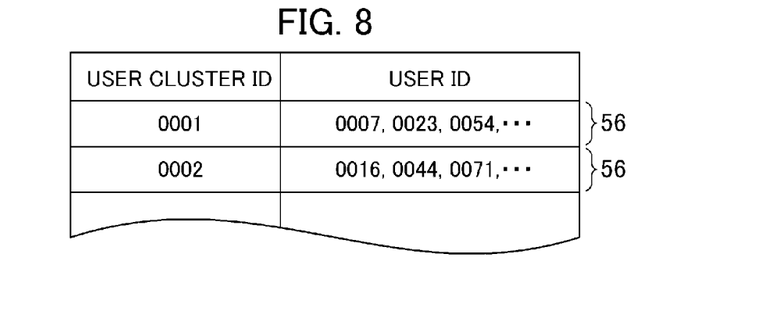
FIG. 8 illustrates an example of user cluster management data.

Similarly, the clustering execution unit 34 generates user cluster management data 56 illustrated in FIG. 8 as an example. The user cluster management data 56 includes a user cluster ID that is an identifier of the user cluster management data 56, and a user ID included in the user feature amount data 52 associated with the corresponding node data. The user cluster management data 56 can include a plurality of user IDs, or a value of the user ID included in the user cluster management data 56 can be null.

Hereinafter, a cluster corresponding to the user cluster management data 56 is referred to as a user cluster. In this embodiment, the user cluster management data 56 indicates that a user corresponding to the user ID included in the user cluster management data 56 belongs to a user cluster corresponding to a user cluster ID included in the user cluster management data 56.

Then, in Step S104, the relationship degree determination unit 36 calculates a degree of relationship indicating strength of a relationship between a content cluster and a user cluster corresponding to a combination of the content cluster indicated by the content cluster management data 54 and the user cluster indicated by the user cluster management data 56 for all combinations of content clusters and user clusters. For example, under the condition that there are generated n content cluster management data pieces 54 and m user cluster management data pieces 56, m*n degrees of relationship are calculated. The relationship degree determination unit 36 calculates, for example, by a numerical expression of (value of degree of relationship corresponding to combination of given content cluster (e.g., content cluster A) and given user cluster (e.g., user cluster B))=(number of posting history data pieces 20 including combination of content ID of content belonging to content cluster A and user ID of user belonging to user cluster B)/(product of number of contents belonging to content cluster A and number of users belonging to user cluster B), the degree of relationship corresponding to the combination of the content cluster A and the user cluster B. The calculation method for the degree of relationship is not limited to the above-mentioned method.

Figure 9:
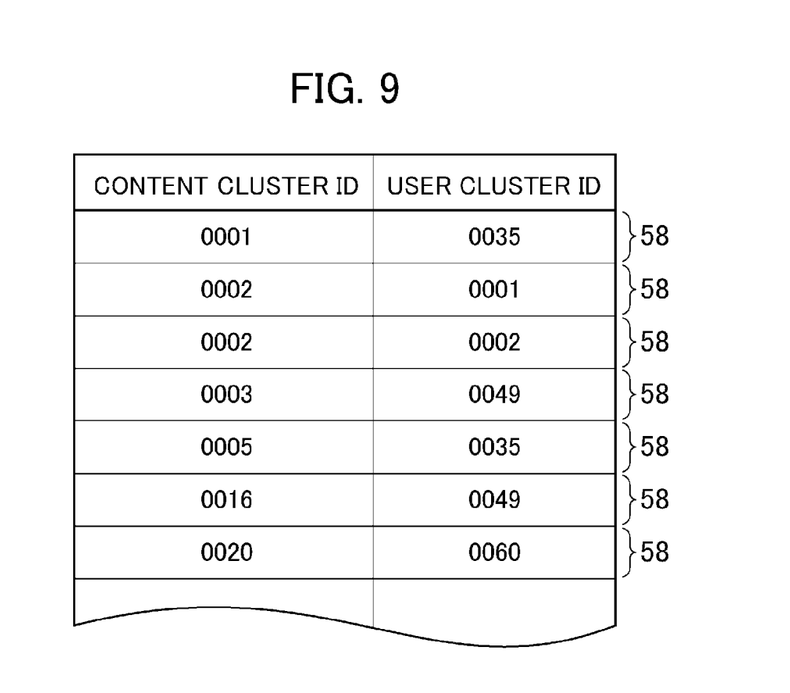
FIG. 9 illustrates an example of cluster correspondence data.

In Step S105, the correspondence setting unit 38 determines a combination of a content cluster and a user cluster, which has a value of a degree of relationship thereof that is equal to or more than a predetermined threshold value, and generates cluster correspondence data 58 illustrated in FIG. 9 as an example corresponding to the determined combination to store the cluster correspondence data 58 in the data storage unit 32. For example, under the condition that a value of a degree of relationship corresponding to the combination of the content cluster A and the user cluster B is equal to or more than the predetermined threshold value, the correspondence setting unit 38 generates the cluster correspondence data 58 including the content cluster ID of the content cluster A and the user cluster ID of the user cluster B. Correspondence is accordingly set between the content cluster and the user cluster. As illustrated in FIG. 9, in this embodiment, content clusters and user clusters may correspond to each other in a many to many relationship. In the example illustrated in FIG. 9, a user cluster corresponding to a user cluster ID 0001 and a user cluster corresponding to a user cluster ID 0002 correspond to a content cluster corresponding to a content cluster ID 0002. A content cluster corresponding to a content cluster ID 0003 and a content cluster corresponding to a content cluster ID 0016 correspond to a user cluster corresponding to a user cluster ID 0049.

Then, in Step S106, the statistic amount calculation unit 40 determines, based on the cluster correspondence data 58, content clusters each corresponding to a plurality of user clusters. For example, it is supposed that a content cluster corresponding to a content ID 0002 has been determined. In Step S107, the statistic amount calculation unit 40 checks whether or not the content clusters determined in Step S106 include content clusters yet to be subjected to processing thereafter. Under the condition that unprocessed content clusters are included (Y in Step S107), in Step S108, the statistic amount calculation unit 40 selects one of the unprocessed content clusters (herein, referred to as selected content cluster), and determines a plurality of user clusters (herein, referred to as selected user clusters) corresponding to the selected content cluster. It is supposed that as selected user clusters, the user cluster corresponding to the user cluster ID 0001 and the user cluster corresponding to the user cluster ID 0002 have been determined.

In Step S109, the statistic amount calculation unit 40 calculates, for the plurality of selected user clusters determined in Step S108, a statistic amount relating to a distribution of times corresponding to the selected user clusters. The statistic amount calculation unit 40 determines, for example, in the posting history data 20, at least one posting date/time associated with combinations of content IDs of contents belonging to the selected content clusters corresponding to the content cluster ID 0002 and user IDs of users belonging to the selected user clusters corresponding to the user cluster ID 0001, and calculates an average value and standard deviation of timestamp values corresponding to the determined posting date/time as statistic amounts for the selected user clusters corresponding to the user cluster ID 0001. The statistic amount calculation unit 40 determines, for example, in the posting history data 20, at least one posting date/time associated with the combinations of content IDs of the contents belonging to the selected content clusters corresponding to the content cluster ID 0002 and user IDs of the users belonging to the selected user clusters corresponding to the user cluster ID 0002, and calculates an average value and standard deviation of timestamp values corresponding to the determined posting date/time as statistic amounts for the selected user clusters corresponding to the user cluster ID 0002. The statistic amounts corresponding to the selected user clusters are not limited to the above-mentioned examples.

In Step S110, the dividing unit 42 determines, based on a difference between the statistic amounts calculated in Step S109 corresponding to the selected user clusters, whether or not the selected content clusters are to be divided. According to this embodiment, the dividing unit 42 determines, for each selected user cluster, a range from a value of ((average value of timestamp values)−(standard deviation of timestamp values)) to a value of ((average value of timestamp values)+(standard deviation of timestamp values)) as a time scope. Then, the dividing unit 42 determines, under the condition that there is a selected user cluster having a time scope not overlapping those of any other selected user clusters, that the selected content cluster is to be divided, and determines that the selected content cluster is not to be divided under the condition that otherwise.

Figure 10:
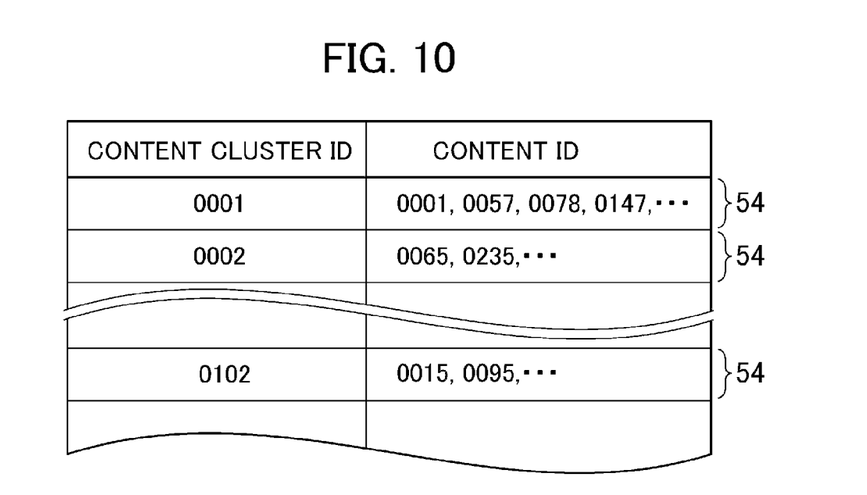
FIG. 10 illustrates an example of the content cluster management data.

Under the condition that the selected content cluster is determined to be divided in Step S110 (Y in Step S110), in Step S111, the dividing unit 42 divides the selected content cluster into a plurality of clusters. The processing in Step S111 is described by way of example in which the user cluster corresponding to the user cluster management data 56 of the user cluster ID 0002 is determined as a selected user cluster having a time scope not overlapping those of any other selected user clusters, and the selected content cluster corresponding to the content cluster ID 0002 is divided. First, the dividing unit 42 generates new content cluster management data 54 where a new content cluster ID (e.g., 0102) is set. Then, the dividing unit 42 determines, in the posting history data 20, content IDs (e.g., 0015, 0095, . . . ) associated with user IDs of users belonging to a user cluster corresponding to the user cluster ID 0002, and sets the determined content IDs as content IDs included in the new content cluster management data 54. The dividing unit 42 determines, in the posting history data 20, at least one content ID (e.g., 0065, 0235, . . . ) associated with a user ID of a user belonging to any one of the selected user clusters (e.g., user cluster corresponding to user cluster ID 0001) other than the user cluster corresponding to the user cluster ID 0002. The dividing unit 42 deletes the content IDs (e.g., 0015, 0095, . . . ) other than the determined content ID from the content IDs included in the content cluster management data 54 where the content cluster ID is 0002. FIG. 10 illustrates an example of the content cluster management data 54 after the dividing unit 42 has thus divided the content cluster corresponding to the content cluster management data 54 where the content cluster ID is 0002.

Figure 11:
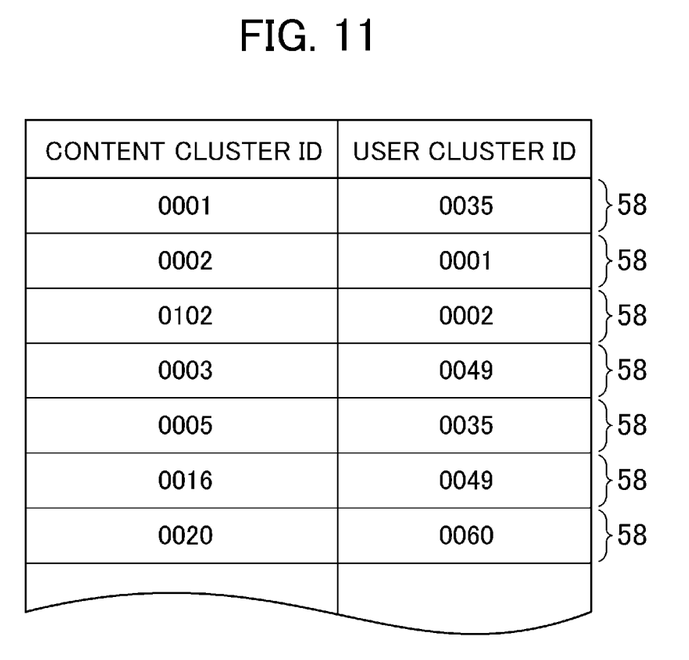
FIG. 11 illustrates an example of the cluster correspondence data.

Then, in Step S112, the dividing unit 42 updates the cluster correspondence data 58 based on the division of the selected content cluster. For example, the diving unit 42 updates, for the cluster correspondence data 58 where correspondence is set between the content cluster ID of the selected content cluster to be divided (in this example, 0002) and the user cluster ID of the selected user cluster having a time scope not overlapping those of any other selected user clusters (in this example, 0002), the included content cluster ID to a content cluster ID of a new content cluster (in this example, 0102). FIG. 11 illustrates an example of the cluster correspondence data 58 thus updated.

Under the condition that it is determined in Step S110 that the selected content cluster is not to be divided (N in Step S110), or under the condition that Step S112 is ended, Step S107 is executed.

Under the condition that it is confirmed in Step S107 that there is no unprocessed content cluster (N in Step S107), in Step S113, the data output unit 44 outputs the content cluster management data 54, the user cluster management data 56, and the cluster correspondence data 58 to the shopping system 12 to end this processing example.

According to this embodiment, the analysis system 10 repeatedly executes Steps S101 to S113 described above. The analysis system 10 may repeatedly execute Steps S101 to S113 described above, for example, at predetermined time intervals. The analysis system 10 may execute Steps S101 to S113 described above, for example, at a time when the number of posting history data pieces 20 stored in the shopping system 12 increases by a predetermined number. Further, in the processing of Step S103 second time and after, the clustering execution unit 34 may execute, in place of executing principal component analysis to generate node data, the processing of (1) to the processing of (3) described above by using node data and a reference vector that are learning results of previous processing. In this case, the clustering execution unit 34 may update, for a content cluster divided into a plurality of clusters during the previous processing, corresponding node data to a plurality of node data pieces respectively corresponding to the plurality of divided clusters. The clustering execution unit 34 may then associate content feature amount data 50 of a content belonging to the corresponding cluster with each node data piece. The clustering execution unit 34 may update, based on the associated content feature amount data 50, the reference vector associated with the node data to execute the processing of (1) to the processing of (3) described above.

The shopping system 12, which has received the above-mentioned data from the analysis system 10, stores the above-mentioned data in the storage unit of the shopping system 12.

In this case, for example, after the user has logged into the shopping system 12 from the client 14, the shopping system 12 generates a top page where titles of those yet to be purchased by the user, among contents belonging to a content cluster corresponding to a user cluster to which the user belongs in the cluster correspondence data 58, are arranged as a list to transmit the top page to the client 14. The client 14 that has received the top page displays the top page on the display via the web browser. Contents are accordingly recommended to the user.

In this embodiment, in the posting history data 20, under the condition that there is a difference in tendency of a date/time indicated by posting date/time data corresponding to a combination of a content ID of a content belonging to a content cluster and a user ID of a user belonging to a user cluster among user clusters (in the above-mentioned example, for example, time scopes do not overlap each other), the content cluster is divided, and correspondence is set between each content cluster and one of the user clusters different from each other in date/time tendency. Thus, according to this embodiment, the difference in tendency of posting date/time associated with the combination of the content cluster and the user cluster among the user clusters is reflected in a result of correspondence between the content cluster and the user cluster.

The present invention is not limited to the above-mentioned embodiment.

For example, in the above-mentioned processing example, the division of the content cluster corresponding to the two user clusters has specifically been described. Similar processing is carried out for division of a content cluster corresponding to k (k is 3 or more) user clusters. For example, under the condition that a selected p-th (where p is any one of 1, 2, . . . k) user cluster has a time scope not overlapping those of any other selected user clusters, and selected user clusters other than the selected p-th user cluster have time scopes overlapping any of those of the other selected user clusters, in the processing of Step S112, the dividing unit 42 may generate content cluster management data 54 corresponding to a new content cluster corresponding to the selected p-th user cluster. In this case, the dividing unit 42 sets, in the posting history data 20, a content ID associated with a user ID of a user belonging to the selected p-th user cluster as a content ID included in the content cluster management data 54.

Further, for example, under the condition that the selected p-th (where p is any one of 1, 2, . . . , k) user cluster and selected q-th (where q is any one of 1, 2, . . . , k, and other than p) user cluster have time scopes not overlapping those of any other selected user clusters, and selected user clusters different from the selected p-th user cluster or the selected q-th user cluster have time scopes overlapping any of those of the other selected user clusters, in the processing of Step S112, the dividing unit 42 may generate content cluster management data 54 corresponding to a new content cluster corresponding to the selected p-th user cluster, and content cluster management data 54 corresponding to a new content cluster corresponding to the selected q-th user cluster. In this case, the dividing unit 42 sets, in the posting history data 20, a content ID associated with a user ID of a user belonging to the selected p-th user cluster as a content ID included in the content cluster management data 54 corresponding to the selected p-th user cluster, and a content ID associated with a user ID of a user belonging to the selected q-th user cluster as a content ID included in the content cluster management data 54 corresponding to the selected q-th user cluster.

For example, in the case of division of a content cluster corresponding to four user clusters, under the condition that a first selected user cluster has a time scope overlapping that of only a second selected user cluster and a third selected user cluster has a time scope overlapping that of a fourth selected user cluster, the dividing unit 42 may divide a content cluster to be divided into a content cluster corresponding to the first selected user cluster and the second selected user cluster, and a content cluster corresponding to the third selected user cluster and the fourth selected user cluster. In this case, the dividing unit 42 may set, in the posting history data 20, a content ID associated with a user ID of a user belonging to the first selected user cluster or the second selected user cluster as a content ID included in content cluster management data 54 corresponding to the first selected user cluster and the second selected user cluster, and set, in the posting history data 20, a content ID associated with a user ID of a user belonging to the third selected user cluster or the fourth selected user cluster as a content ID included in content cluster management data 54 corresponding to the third selected user cluster and the fourth selected user cluster.

The analysis system 10 may analyze, for example, in place of the posting history, user's access history to a page providing information relating to contents (access history data includes, for example, data indicating a content ID of the content, a user ID of the user, and a time of user's accessing to the information relating to the contents (e.g., date/time)) or user's content purchase history (purchase history data includes, for example, data indicating a content ID of the content, a user ID of the user, and a time of user's content purchasing (e.g., date/time)) as described above to set correspondence between a content cluster and a user cluster or divide the content cluster.

Data indicating a period determined based on the above-mentioned time scope may be associated with the cluster correspondence data 58 of the divided content cluster. Specifically, for example, data obtained by conversion of the above-mentioned time scope into a range of a time passage from a content release date/time or data obtained by conversion of a range from a value of ((average value of time stamp values)−(a times as large as standard deviation of time stamp value)) to a value of ((average value of time stamp values)+(a times as large as standard deviation of time stamp value)) into the range of the time passage from the content release date/time may be associated with the content cluster management data 54. In this case, the shopping system 12 may notify, at a time when the passage of time from the content release date/time comes within the above-mentioned range, the user belonging to the user cluster ID corresponding to the user cluster ID included in the cluster correspondence data 58 of an advertising statement of contents belonging to the content cluster ID corresponding to the content cluster ID included in the cluster correspondence data 58 by e-mail, for example. Alternatively, the shopping system 12 may arrange, when the passage of time from the content release date/time is within the above-mentioned range, the advertising statement on the page provided to the client 14 from the shopping system 12. Still alternatively, the shopping system 12 may arrange an advertising statement varied depending on whether or not the passage of time from the content release date/time is within the above-mentioned range on the page provided to the client 14 from the shopping system 12.

The content cluster management data 54, the user cluster management data 56, and the cluster correspondence data 58 which are generated by the analysis system 10 may be used for prediction of an increase or decrease of sales, or change of a lineup of products or property of products.

Division of roles among the analysis system 10, the shopping system 12, and the client 14 according to this embodiment is not limited to the above-mentioned division. For example, the analysis system 10 may also function as the shopping system 12. Specifically, the analysis system 10 may include an information providing unit that provides, to the client 14, a page including information relating to contents belonging to a content cluster corresponding to a user cluster to which the user of the client 14 belongs.

The above-mentioned specific character strings and the specific character strings in the drawings are only examples, and thus are not limitative of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing system for analyzing a selected content cluster among a plurality of content clusters, where the selected content cluster includes a group of associated content and is in correspondence with a plurality of respective user clusters, each user cluster including a respective group of associated users, the system comprising a micro-processor operating under the instructions of a computer program, which causes the micro-processor to include:
an association data acquisition unit that acquires association data, which includes respective combinations of the content belonging to the selected content cluster, the users belonging to the plurality of user clusters, and a plurality of times at which the users took action concerning the content of the selected content cluster;
a statistic amount calculation unit that calculates statistics for each of the user clusters based on the plurality of times of the association data, wherein the statistics for each of the user clusters includes: (i) an average (AVG) representing an average of all the times that the users of a given one of the plurality of user clusters took action concerning the content of the selected content cluster, (ii) a standard deviation (STD) representing an standard deviation of all the times that the users of the given one of the plurality of user clusters took action concerning the content of the selected content cluster, and (iii) computing a time scope for each user cluster, where AVG−STD time scope≤AVG+STD;
a determining unit that determines whether or not the selected content cluster is to be divided into at least two content clusters, the determination being based on whether one of the time scopes does not overlap any of the other time scopes, and if so then the determination is affirmative and the selected content cluster is to be divided into the at least two content clusters;
a dividing unit that divides the selected content cluster into at least two content clusters when the determination is in the affirmative, and specifies for each of the at least two content clusters at least one of the user clusters to be in correspondence therewith; and
a setting unit that sets respective groups of the content into each of the at least two content clusters based on the association data.

2. The information processing system according to claim 1, further comprising an information providing unit that provides, to the user, information relating to a content belonging to a content cluster corresponding to the user cluster to which the user belongs.

3. The information processing system according to claim 1, wherein the respective times in the association data is one of a time when the user accesses information relating to the content, a time when a comment on the content is received from the user, and a time when the user purchases the content.

4. An information processing method for analyzing a selected content cluster among a plurality of content clusters, where the selected content cluster includes a group of associated content and is in correspondence with a plurality of respective user clusters, each user cluster including a respective group of associated users, the method comprising:
acquiring association data, which includes respective combinations of the content belonging to the selected content cluster, the users belonging to the plurality of user clusters, and a plurality of times at which the users took action concerning the content of the selected content cluster;
calculating statistics for each of the user clusters based on the plurality of times of the association data, wherein the statistics for each of the user clusters includes: (i) an average (AVG) representing an average of all the times that the users of a given one of the plurality of user clusters took action concerning the content of the selected content cluster, (ii) a standard deviation (STD) representing an standard deviation of all the times that the users of the given one of the plurality of user clusters took action concerning the content of the selected content cluster, and (iii) computing a time scope for each user cluster, where AVG−STD time scope≤AVG+STD;
determining whether or not the selected content cluster is to be divided into at least two content clusters, the determination being based on whether one of the time scopes does not overlap any of the other time scopes, and if so then the determination is affirmative and the selected content cluster is to be divided into the at least two content clusters;
dividing the selected content cluster into at least two content clusters when the determination is in the affirmative, and specifying for each of the at least two content clusters at least one of the user clusters to be in correspondence therewith; and
setting respective groups of the content into each of the at least two content clusters based on the association data.

5. A non-transitory computer readable information storage medium storing a program which is to be executed by a computer and cause the computer to execute actions for analyzing a selected content cluster among a plurality of content clusters, where the selected content cluster includes a group of associated content and is in correspondence with a plurality of respective user clusters, each user cluster including a respective group of associated users, the actions comprising:
acquiring association data, which includes respective combinations of the content belonging to the selected content cluster, the users belonging to the plurality of user clusters, and a plurality of times at which the users took action concerning the content of the selected content cluster;
calculating statistics for each of the user clusters based on the plurality of times of the association data, wherein the statistics for each of the user clusters includes: (i) an average (AVG) representing an average of all the times that the users of a given one of the plurality of user clusters took action concerning the content of the selected content cluster, (ii) a standard deviation (STD) representing an standard deviation of all the times that the users of the given one of the plurality of user clusters took action concerning the content of the selected content cluster, and (iii) computing a time scope for each user cluster, where AVG−STD time scope≤AVG+STD;
determining whether or not the selected content cluster is to be divided into at least two content clusters, the determination being based on whether one of the time scopes does not overlap any of the other time scopes, and if so then the determination is affirmative and the selected content cluster is to be divided into the at least two content clusters;
dividing the selected content cluster into at least two content clusters when the determination is in the affirmative, and specifying for each of the at least two content clusters at least one of the user clusters to be in correspondence therewith; and
setting respective groups of the content into each of the at least two content clusters based on the association data.

* * * * *